No. 848,936. PATENTED APR. 2, 1907.
M. O. TROY.
MEANS FOR IMPROVING THE POWER FACTOR OF ALTERNATING CURRENT CIRCUITS.
APPLICATION FILED SEPT. 21, 1904.
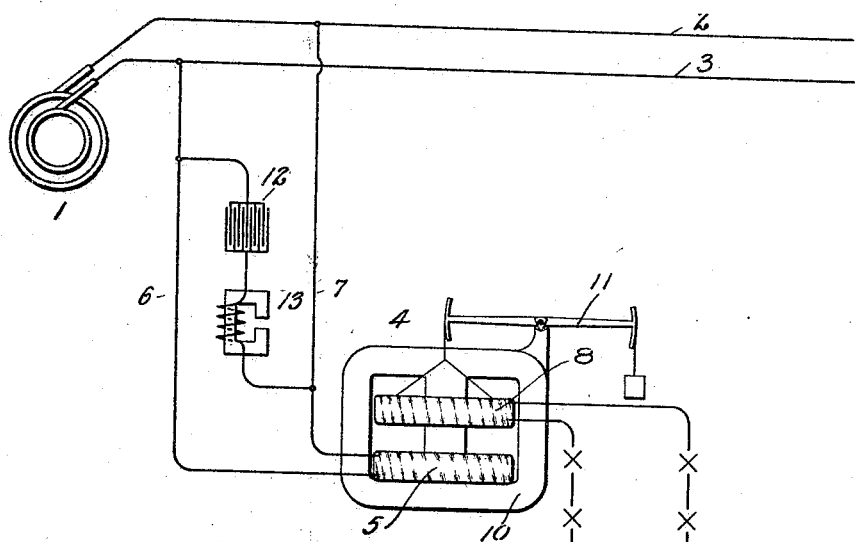
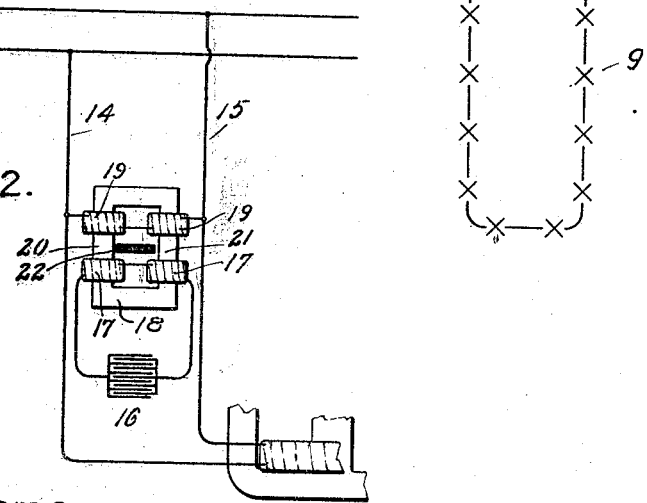
WITNESSES:
*George A. Thornton*
*Helen Oxford*
INVENTOR:
Matthew O. Troy.
By *Albert S. Davis*
Att'y.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

MEANS FOR IMPROVING THE POWER FACTOR OF ALTERNATING-CURRENT CIRCUITS.

No. 848,936.    Specification of Letters Patent.    Patented April 2, 1907.

Application filed September 21, 1904. Serial No. 225,308.

*To all whom it may concern:*

Be it known that I, MATTHEW O. TROY, a citizen of the United States, residing at Schenectady, county of Schenectady, State of New York, have invented certain new and useful Improvements in Means for Improving the Power Factor of Alternating-Current Circuits, of which the following is a specification.

My present invention comprises means for improving the power factor of alternating-current circuits supplying inductive loads—such, for example, as constant-current transformers, constant-current reactive coils, or the like.

In carrying my invention into practice various modified embodiments of my invention may be utilized. Ordinarily, however, I connect in shunt to the circuit in which the power factor is low a condenser provided with means, arranged in accordance with my invention, for rendering the action of said condenser effective. If a condenser alone be placed across a low-power-factor circuit, it will generally be found that instead of improving the power factor, as might be expected, there is either very little improvement or none at all. This is due to the fact that the condenser tends to accentuate the harmonics in the electromotive-force wave in such a manner as to interfere with if not entirely prevent the expected compensation for the lagging current of the load. I have found that this objectionable action may be eliminated and the beneficial effect of the condenser obtained by including in the circuit of the condenser an inductance sufficient to damp out the objectional harmonics and increasing the capacity of the condenser by an amount sufficient to balance the inductance. The preponderating magnitude of the condenser is then free to take from the source a leading current sufficient under some conditions of load to compensate entirely for the lagging current of the load and at other conditions to improve greatly the power factor over that which would exist without the use of the condenser.

The novel features which characterize my invention I have pointed out with particularity in the appended claims. The invention itself, however, will be better understood by reference to the following description, taken in connection with the accompanying drawings, in which—

Figure 1 represents a system embodying one form of my invention, and Fig. 2 a modification thereof.

In Fig. 1 a source of alternating current is conventionally indicated at 1 and the mains extending therefrom at 2 and 3. A moving-coil constant-current transformer of a well-known type is illustrated at 4. The primary winding 5 of this transformer receives current from the leads 6 and 7, connected across the mains 2 and 3. The secondary 8 is connected to the constant-current consumption-circuit 9, which includes lamps or other suitable translating devices. Both of these coils are mounted on the three-legged core 10. The primary 5 is in a fixed position relative to the core, while the secondary 8 is practically counterbalanced in a well-understood manner by the weighted lever-arm 11.

In order to compensate for the lagging current taken from the mains 2 and 3 by the transformer 4, which lagging current, especially at light loads, lowers the power factor of the system materially, I connect in shunt with the primary leads 6 and 7 a condenser-inductance combination, which in the particular form shown in Fig. 1 consists of a condenser 12 in series with the inductance-coil 13. The condenser alone, as already stated, would not, because of the presence of harmonics, have the effect of improving the power factor to the extent desired. I connect in series with the condenser, however, the inductance-coil 13, which has the effect of damping out the harmonics. Inasmuch as the inductance neutralizes a certain proportion of the condenser, I make the condenser large enough so that its preponderating effect is of a magnitude sufficient to draw from the leads 6 and 7 a leading current of the amount necessary to neutralize as far as possible the lagging current taken by the transformer 4. Inasmuch as the load on a transformer is variable, the value of condenser and inductance chosen is necessarily a compromise, and depends upon the primary circuit in connection with which my invention is used. As between the condenser and inductance, however, I generally find is preferable to choose the inductance of such magnitude that the volt-amperes taken by it are about one-quarter those taken by the condenser.

Where the voltage of the circuit in connection with which the condenser is to be used is not high, it is of considerable advantage to supply the condenser with current inductively derived from the circuit. The voltage impressed upon the condenser from the secondary of the transformer or compensator, as the case may be, may thus be raised to any desired amount, and the size of the condenser required thus reduced correspondingly. In such a case I design the transformer so as to have in itself such an amount of inductance as to eliminate the necessity for a separate inductance, such as 13 in Fig. 1. Such an arrangement is shown in Fig. 2, in which the leads 14 and 15 correspond to the leads 6 and 7 in Fig. 1. These leads are supposed to supply energy to a circuit taking low-power-factor current. The condenser for overcoming this low-power factor, as indicated at 16, is connected, as shown, to the secondary windings 17 of a transformer of special construction. These windings are located at one end of the core 18 and the corresponding primary windings 19 at the opposite end, as shown. Between the two legs 20 and 21, upon which the coils are placed, I provide a laminated iron bridge 22 for causing a leakage of flux across the space between the primary and secondary coils. The inductance of the transformer may be thus adjusted to any desired amount, and in practice is proportioned so as to replace the effect which would be given by corresponding inductance directly in series with the condenser 16.

It is evident that various modifications of my invention may be employed without departing from the spirit thereof, for which reason I do not wish to be limited to the exact details shown and described.

What I claim as new, and desire to secure by Letters Patent of the United States, is—

1. The combination of an alternating-current supply-circuit, a consumption-circuit including a device or devices taking lagging current from the supply-circuit, and means for improving the power factor of said supply-circuit consisting of a condenser and an inductance in series with each other in a circuit independent of said consumption-circuit.

2. The combination of a source of alternating current, a circuit taking lagging current therefrom, and an independent circuit taking leading current from said source, the last-mentioned circuit including a condenser provided with means for eliminating the effect of minor harmonics.

3. The combination of a source of alternating current, a constant-current circuit supplied with energy from said source, a circuit fed from said source independently of said constant-current circuit and including a condenser with means for eliminating the effect of harmonics on said condenser.

In witness whereof I have hereunto set my hand this 20th day of September, 1904.

MATTHEW O. TROY.

Witnesses:
BENJAMIN B. HULL,
HELEN ORFORD.